June 26, 1962   J. P. SMITH, JR   3,040,700
INDICATOR AND TOTALIZER SYSTEMS
Filed March 17, 1959   6 Sheets-Sheet 1
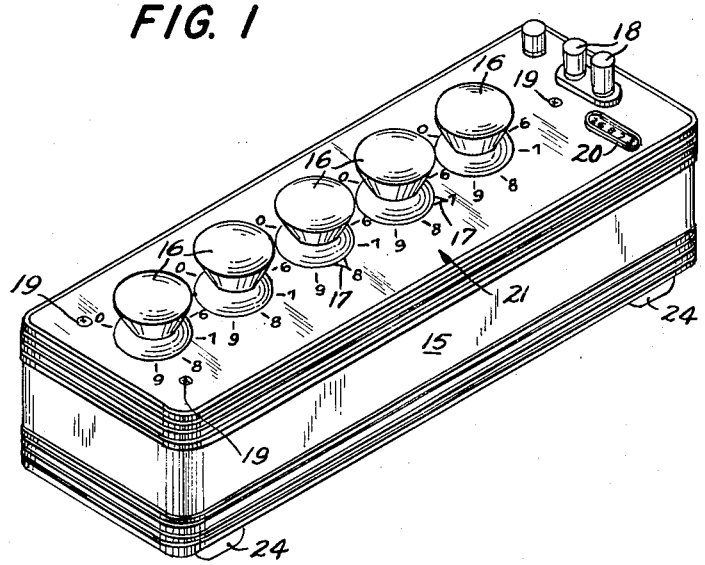
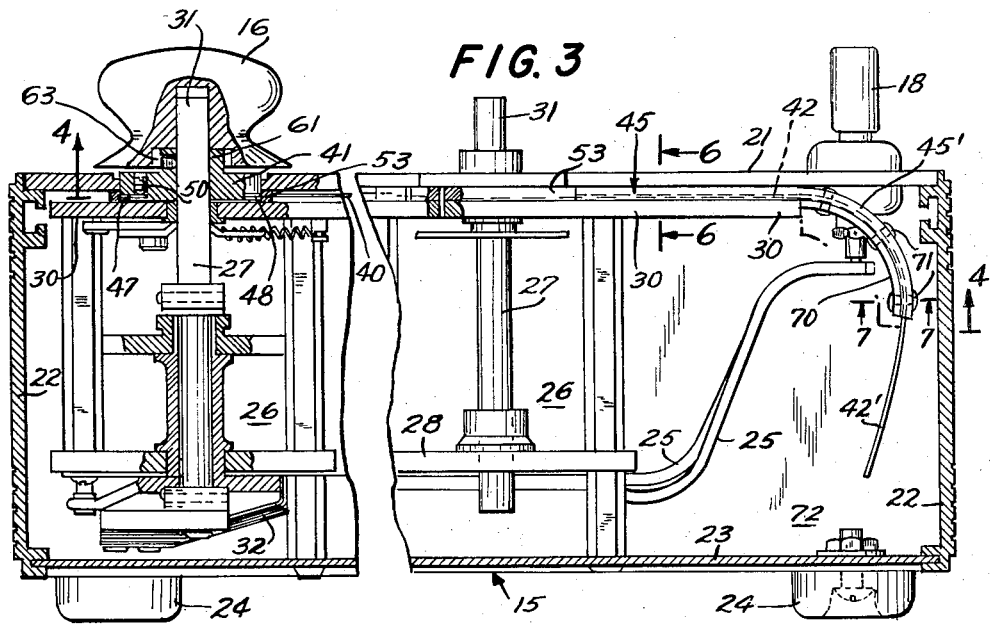
INVENTOR.
JOHN PRESTON SMITH JR.
BY
Richard A. Marsen
ATTORNEY INVENTOR.
JOHN PRESTON SMITH JR.
BY
Richard A. Marsan
ATTORNEY

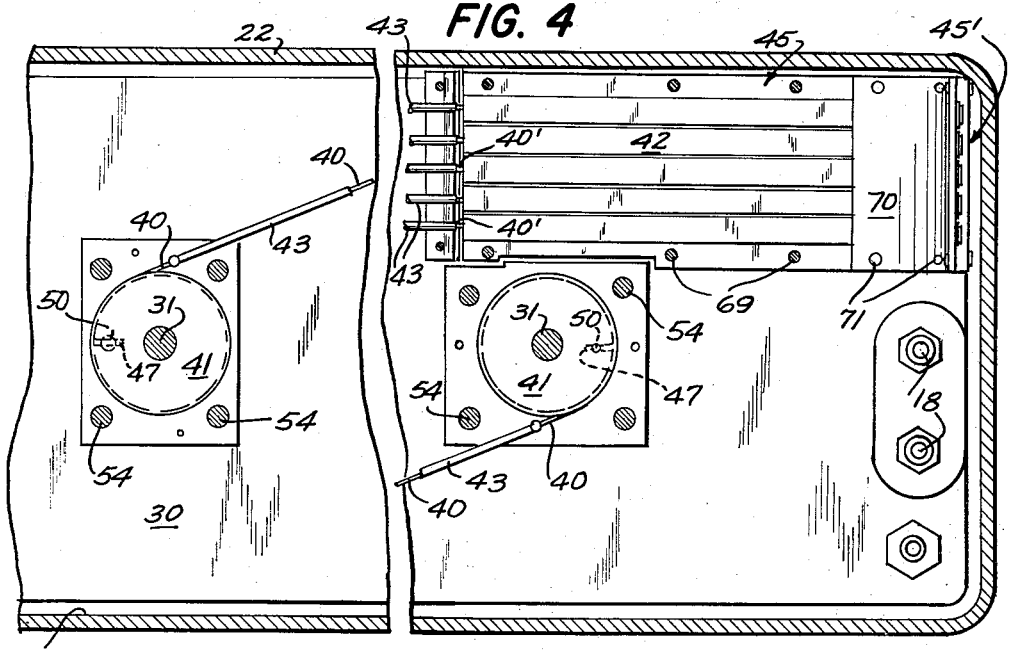
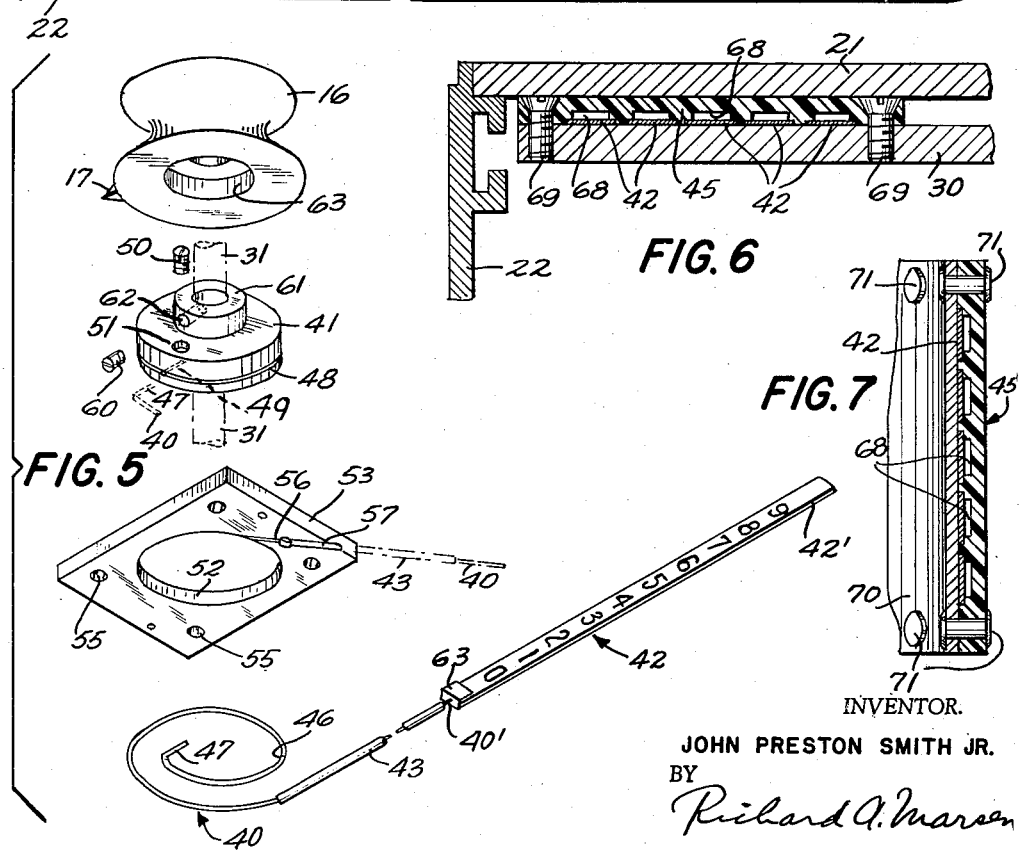

June 26, 1962     J. P. SMITH, JR     3,040,700
INDICATOR AND TOTALIZER SYSTEMS
Filed March 17, 1959     6 Sheets-Sheet 4

INVENTOR.
JOHN PRESTON SMITH JR
BY
Richard A. Marsen
ATTORNEY

June 26, 1962

J. P. SMITH, JR 3,040,700

INDICATOR AND TOTALIZER SYSTEMS

Filed March 17, 1959

INVENTOR.
JOHN PRESTON SMITH JR.
BY
*Richard A. Marsen*
ATTORNEY

June 26, 1962  J. P. SMITH, JR  3,040,700
INDICATOR AND TOTALIZER SYSTEMS
Filed March 17, 1959  6 Sheets-Sheet 6

INVENTOR.
JOHN PRESTON SMITH JR.
BY
Richard A. Marsen
ATTORNEY

United States Patent Office 3,040,700
Patented June 26, 1962

3,040,700
INDICATOR AND TOTALIZER SYSTEMS
John P. Smith, Jr., Manchester, N.H., assignor, by mesne assignments, to The Daven Company, a corporation of Delaware
Filed Mar. 17, 1959, Ser. No. 799,871
2 Claims. (Cl. 116—135)

This invention relates generally to indicator and totalizer systems and more particularly to novel indicator and totalizer systems incorporated in decade boxes.

Electrical decade boxes contain knobs that are rotated to alter the value of an associated electrical section in the composite circuit thereof. In this manner accurate total values are set-up for resistance, inductance, capacitance, attenuation, and the like. Coupling each knob to a ten-unit numerical component of a totalizer provides direct reading of composite settings. Heretofore, such totalizers incorporated number wheels or tapes arranged with biasing or return springs. Patent Number 2,597,123 which was issued on May 20, 1952, and is assigned to the assignee of this case, is illustrative of such prior totalizer arrangements.

In accordance with one aspect of my present invention, I provide a decade box with a plurality of flat flexible numeral tapes arranged adjacent each other in a common tape guide. One end of each tape is coupled to an individual setting knob of the decade box, in a firm push-pull displacement relationship therewith. The other end of each tape is kept free, and rides in the tape guide remote from the knobs. No biasing springs are utilized. The invention totalizer system is arranged flat upon the chassis, and requires no added bulk in the decade box. The tape free ends are directed beyond an edge of the chassis in the tape guide, thereby permitting rather long tapes to be used. Thus, relatively large numerals are feasible in the invention totalizer, despite the negligible addition to bulk of the decade box.

The flexible numeral tapes hereof are preferably made of steel, although other metal, paper or plastic material may instead be used. The common guide is grooved to guide each tape in a positive manner. The push-pull wire for each tape is encased and guided in a suitable tube extending between the knob assembly and the tape guide. A rugged construction results, that insures accurate readings and long-life for the totalizer system hereof, even under adverse conditions of usage and climate. The direct and positive displacements, with avoidance of biasing springs and wheels, provides foolproof operation. The invention totalizer, further, is relatively lower in cost, per se, than prior equivalent devices. This, coupled with the fact that the overall dimensions of a decade box incorporating the herein totalizer system are not increased, results in substantial overall savings.

The totalizer system of my present invention is compact, and arranged flat with the chassis or frame that supports the decade components and knob assembly. A basic design and dimensions for the decade box prevails, whether or not the totalizer system is mounted; only the top panel need be changed. Thus a common design and bill of material is feasible for both versions of a decade box. The knob assembly elements coacting with steel push-pull wire are preferably case-hardened to minimize wear and maintain phasing of the numerals. Further, novel means is provided to adjust the phase of the individual tape numerals to synchronize with their respective knob positions, without disassembling the chassis, as will be described hereinafter. The invention hereof may be applied to other than decade boxes; and may be used as an individual units indicator.

A primary object of this present invention is to provide a novel compact totalizer system.

Another object of the present invention is to provide a novel totalizer system for electrical decade boxes.

A further object of the present invention is to provide novel indicator and totalizer systems incorporating flat numeral tapes each free at one end, and without the use of biasing springs.

Still another object of the present invention is to provide a novel totalizer system of positive, fool-proof, rugged construction.

Still a further object of the present invention is to provide a novel totalizer system, arranged flat with the chassis, and directly phase adjustable.

The above and other objects of the present invention will become more apparent from the following description of exemplary embodiments thereof, illustrated in the drawings, in which:

FIG. 1 is a perspective illustration of one form of the invention as applied to decade resistance box.

FIG. 3 is a side elevational view of the decade box of FIG. 1, corresponding to that taken along the line 3—3 of FIG. 2.

FIG. 4 is a bottom view of the totalizer system, taken along the line 4—4 of FIG. 3, in the direction of the arrows.

FIG. 5 is an exploded view of a knob assembly and associated numeral tape of the totalizer system of FIGS. 1 to 4.

FIGS. 6 and 7 are enlarged cross-sectional views through the numeral tape guide assembly, taken along the lines 6—6 and 7—7 of FIG. 3, in the direction of the arrows.

Figure 8:
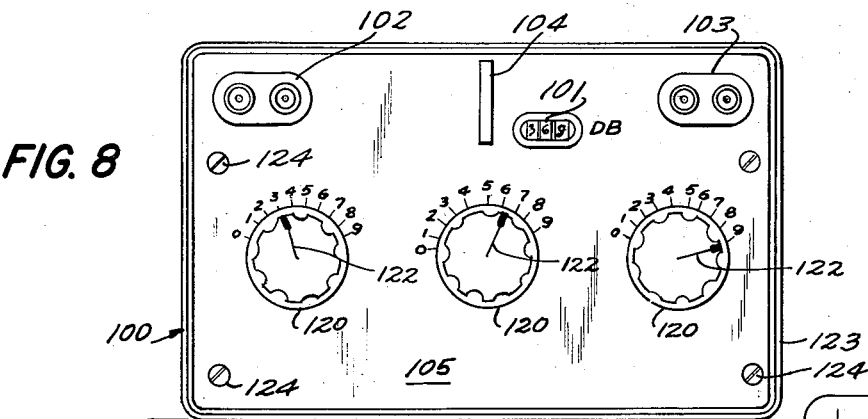

FIG. 8 is a plan view of a decade attenuator box, constituting a further embodiment of the totalizer invention hereof.

Figure 9:
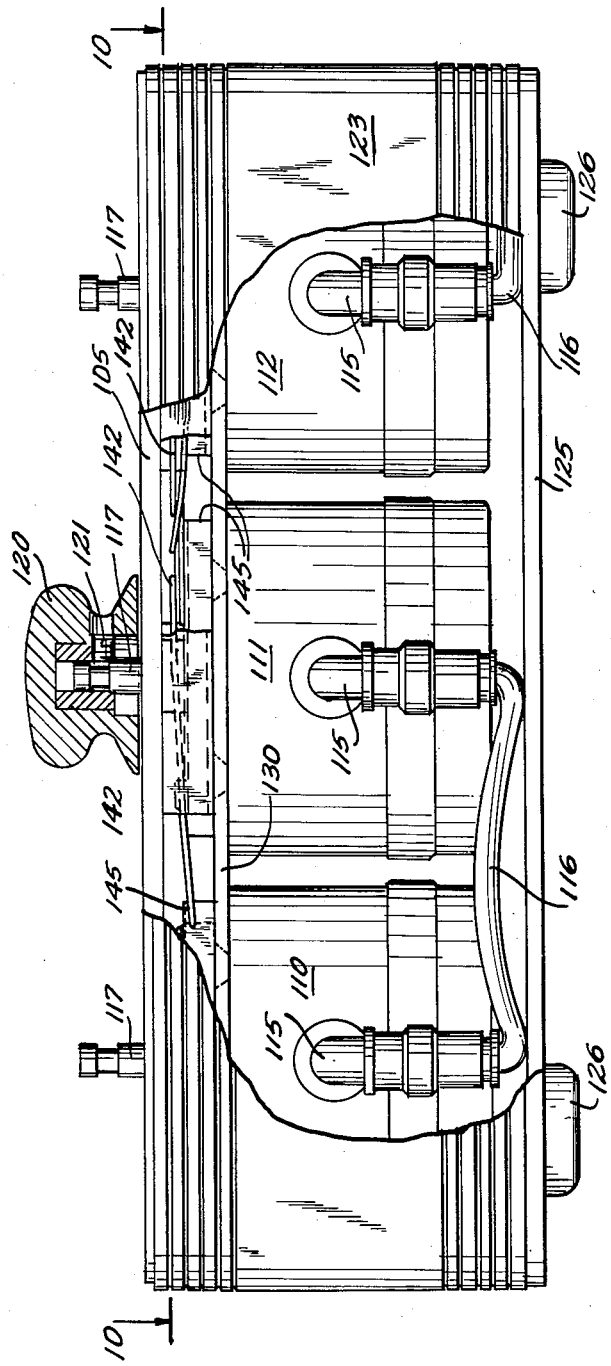

FIG. 9 is an enlarged side elevational view of the decade attenuator of FIG. 8, partially broken away, showing interior components.

Figure 10:
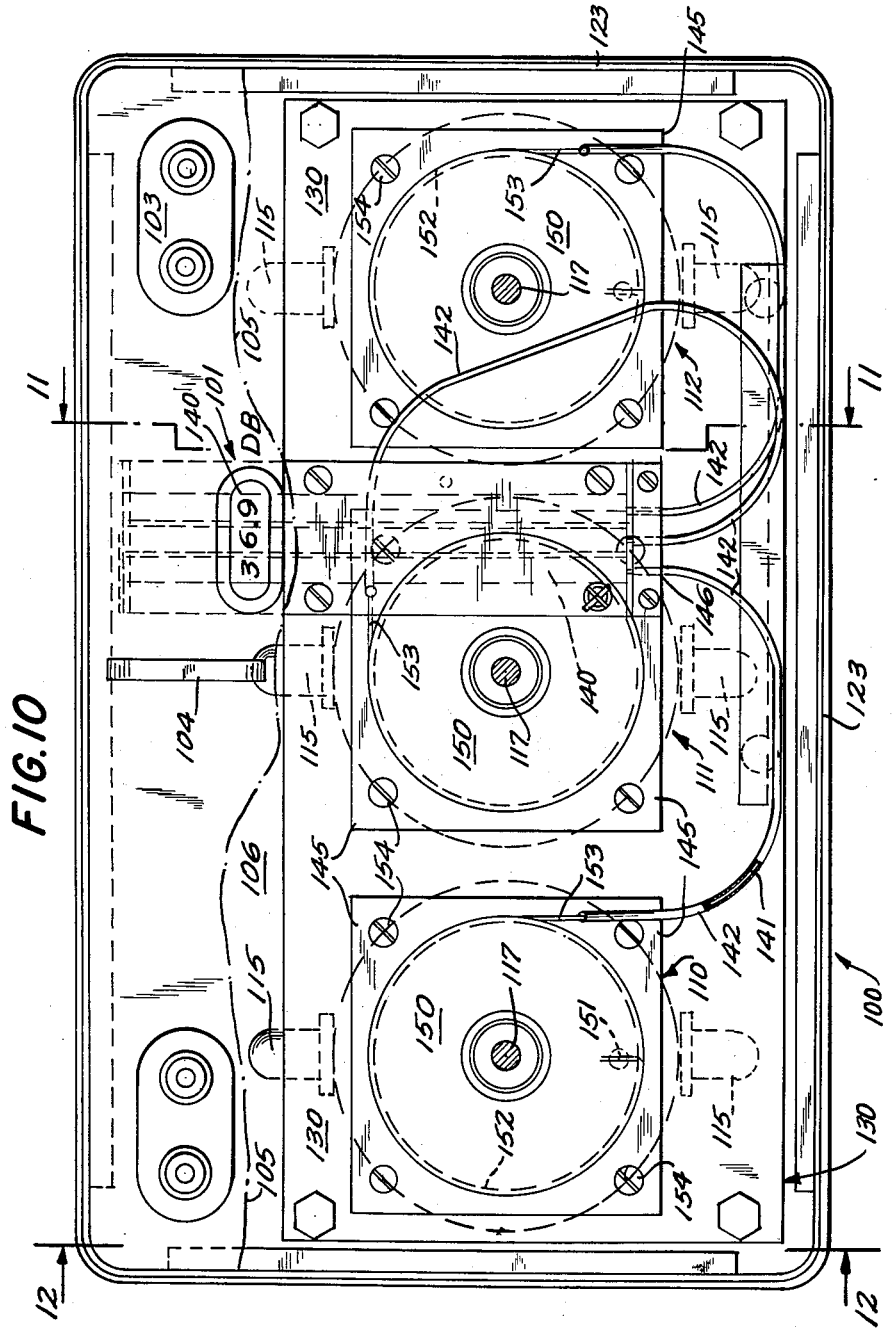

FIG. 10 is a plan view of the decade attenuator of FIGS. 8 and 9, with top panel broken away, taken along the line 10—10 of FIG. 9, illustrating the chassis and totalizer assembly thereof.

Figure 11:
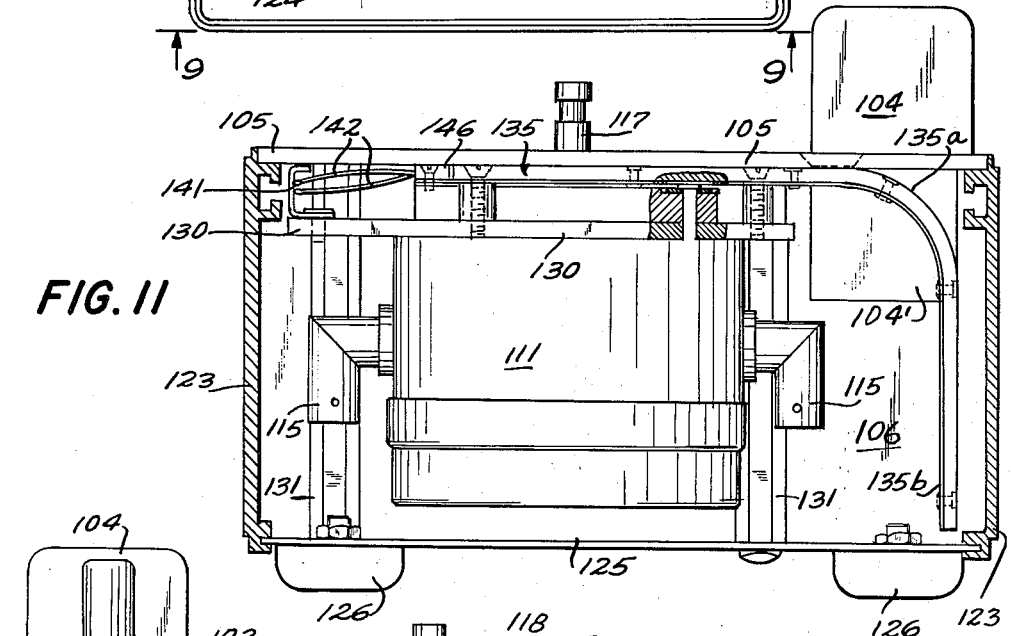

FIG. 11 is a cross-sectional view through the decade attenuator of FIGS. 8, 9 and 10, taken along the line 11—11 of FIG. 10, in the direction of the arrows.

Figure 12:
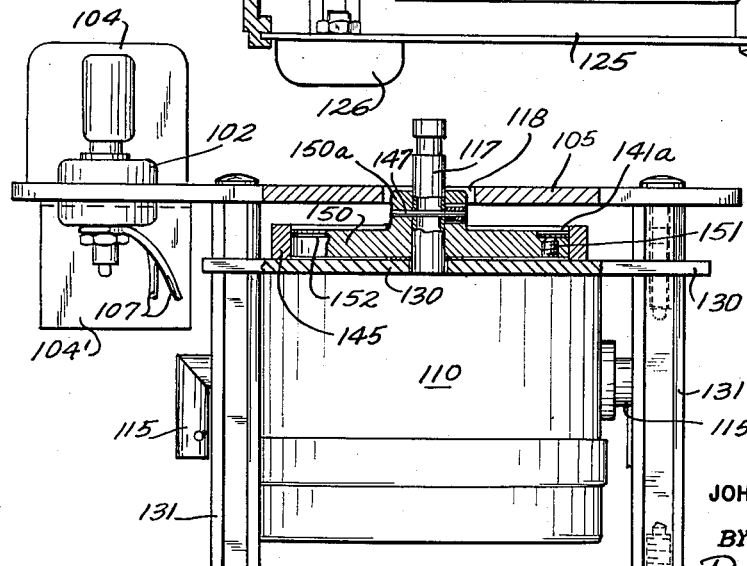

FIG. 12 is a cross-sectional view through the decade attenuator of FIGS. 8, 9 and 10, taken along the line 12—12 of FIG. 10, in the direction of the arrows.

Figure 2:
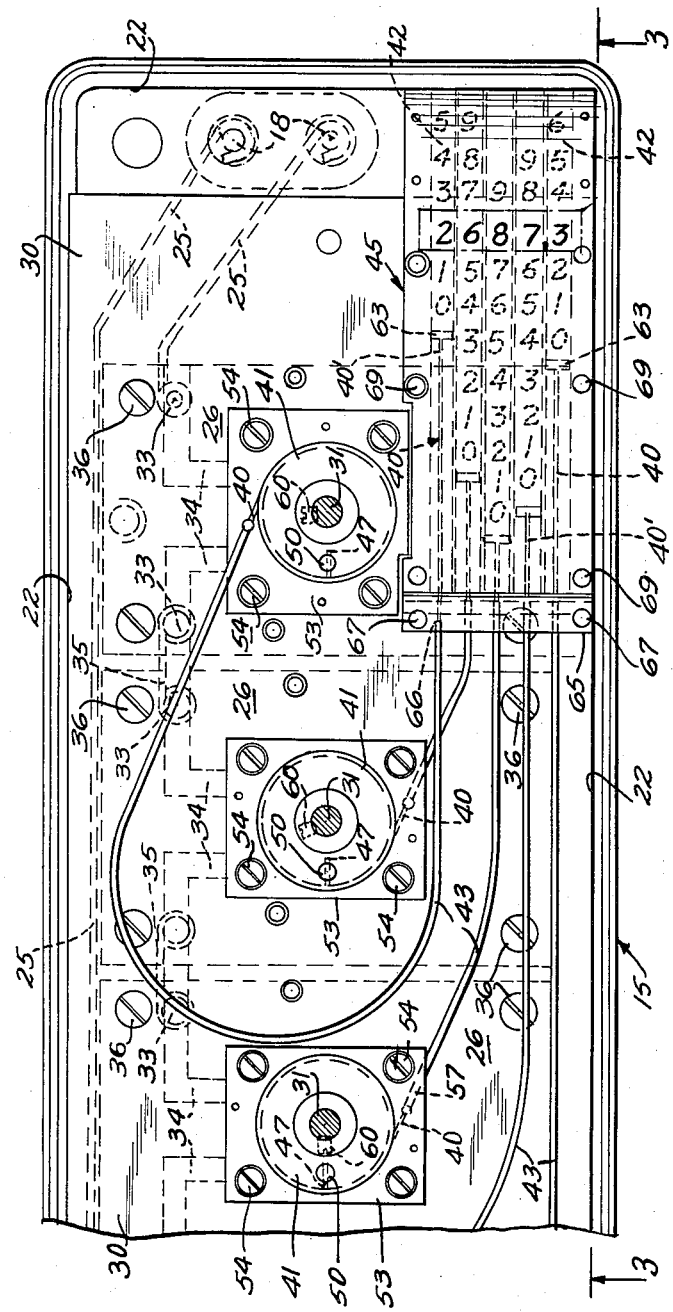
FIG. 2 is an enlarged top view of a section of the decade box of FIG. 1 with the top panel removed, exposing the chassis and totalizer system thereof.

FIGS. 1 to 7 illustrate an exemplary five-unit precision resistance decade box 15. There are five decade resistance units manually set by knobs 16 individual thereto. There are ten positions for each of the knobs 16, from 0 through 9. A pointer 17 indicates the position of each knob 16 at its respective resistance section. The binding posts 18 are connected in series with the respective resistance sections of decade box 15, in a conventional manner. Each resistance section represents a resistance value between binding posts 18 corresponding to its numerical total indicated by the scale reading at its knob 16 setting. The resistance total is indicated at window 20 which exposes the numerals that is the sum of the decade resistance elements as set up in unit 15. The total indicated in FIGS. 1 and 2 is 2687.3 ohms.

It is to be understood that the invention totalizer system is applicable to other than decade resistance boxes. It is usable for inductance or capacitance decade units, and for other electrical devices such as attenuators or bridges. Further, it is usable for non-electrical decade devices as well, other than decade units, and for individual tape indication, as will be understood by those skilled in the art.

Referring to FIG. 3, the binding posts 18 are supported in a metal top panel 21. The binding posts 18 are insulated from each other and from panel 21 in a conventional manner. Panel 21 is secured in position in unit 15 through suitable screws 19, 19, as seen in FIG. 1. The top panel rests in sides 22 of the composition frame of unit 15. The base 23 is set into sides 22. Suitable feet 24 are fastened to bottom plate 23. Individual connection leads 25, 25 extend to the resistance sections 26 of the decade box, in a conventional manner. The decade resistance sections 26 are shown in fragmentary form, their specific construction not being part of the present invention.

As seen in FIG. 3 the central control shaft 27 of each resistance section 26 is rotatably mounted between sub-chassis plates 28 and 30. A slotted shaft extension 31 of each control shaft 27 is arranged for securement to the individual knobs 16, through a suitable fastening means not shown. A wiper blade 32 is secured to the interior end of each control shaft 27 connecting to suitable resistance taps in the units 26, in a conventional manner. Each decade section 26 has predetermined decade resistance denomination, such as "thousands," "hundreds," down to "tenths."

The decade units 26 each have terminals 33, 33, and conductors 34 extending from their resistance sections to the terminals 33, as seen in FIG. 2. Connection links 35 extend between adjacent terminals 33, 33 for series interconnection of the units 26. The individual decade resistance units 26 are removably mounted to chassis 30 by fastening screws 36, 36. The terminal leads 25, 25 extend to both end units 26 as indicated in FIG. 2.

The totalizer assembly of decade resistance box 15 comprises individual push-pull wires 40. The path of each push-pull wire 40 extends in a predetermined manner between a wrap-pulley 41 suitably secured to each control shaft 27 and its associated flat numeral tape 42, see FIGS. 2 and 5. Each wire 40 is contained in an individual guide tube 43. The guide tubes 43, 43 are fastened in position in the totalizer assembly, in a manner to prevent the push-pull wires 40 from being dislocated or tangled, (see FIG. 2). As each control shaft 31 is positioned through its associated knob, it wraps or unwraps the push-pull wire 40 thereof about the pulley 41 rotated with shaft 27. In this manner the push-pull wire 40 displaces the free-ended numeral tape 42 secured therewith in a positive linear manner, along the multiple tape guide 45. The numerals of the tapes 42 are synchronized with the discrete positions of their corresponding control shafts 27, so as to accurately denote the shaft positions and therefore the total resistance set-up in circuit with binding posts 18. Such shaft (27) positions are directly translated as numerical readings in ohms at window 20, (see FIGS. 1 and 2).

Details of the securement of push-pull wires 40 with associated control shafts 31, is best seen in the exploded view, FIG. 5. The interior end of each push-pull wire 40 is arcuate, as at 46, to coact with a groove 48 about the peripheral face of wrap-pulley 41. The interior tip 47 of push-pull wire 40 is bent sharply radially inward to fit into a longitudinal radial aperture 49, in wrap-pulley 41. A set screw 50 mounts in threaded opening 51 above the longitudinal slot 49 to lock tip 47 of wire 40 in position about the wrap-pulley 41.

With tip 47 locked to wrap-pulley 41, the curved portion 46 of wire 40 fits above groove 48 thereof. Wrap-pulley 41 fits snugly within a central opening 52 of a wrap-limit plate 53. Wrap-limit plate 53 is secured to chassis 30 by mounting screws 54 through openings 55 in plate 53. Wrap-limit plate 53 contains two aligned grooves 56, 57 arranged tangently about the circular opening 52 therein, (see FIG. 5). The grooves 56, 57 are arranged to guide the push-pull wire 40 beyond plate 53 and to anchor the end-portion of guide tube 43 in groove 57. In this manner the linear translation of the rotation of shaft 27 is effective across the wrap-groove 48 of wrap-pulley 41, and the extension therefrom across grooves 56 and 57 of wrap-limit plate 53.

The guide tube 43 rests in groove 57 of wrap-limit plate 53. The wrap-pulley 41 is suitably secured to control shaft 31 by a set-screw 60 coacting with a collar 61 of pulley 41 at threaded aperture 62 thereof. The knob 16 is suitably secured directly to either control shaft 27 or collar 61 of wrap pulley 41. The remote end 40' of each push-pull wire 40 is secured to bent-over tip 63 of numeral tape 42, preferably by welding, (see FIG. 5). A very important practical advantage accrues from the herein-setforth arrangement of collar 61 extending from wrap-pulley 41 and its mode of securement to control shaft 27. This advantage is to synchronize or phase each tape numeral with the knob 16 settings, without removing the chassis 30, or even top panel 21, as will be described hereinafter.

The stub or collar 61 extends above the top surface of the top panel 21 as shown in FIG. 3. Control knob 16 is recessed at 63 and overlaps stub 61. Knob 16 thus rests adjacent panel 21. When knob 16 is removed from shaft 31 the collar 61 is exposed. The wrap-pulley 41 is rotatable within a suitable opening in top panel 21. The wrap-limit plate 53, secured to the top of the metallic chassis 30 by screws 54, 54, extends in the space between chassis 30 and panel 21, as seen in FIG. 3.

The length of the push-pull wires 40 are respectively proportioned wherein the "zero" numeral of the respective flat tape 42 appears at window 20 when pointer 17 of the associated control knob 16 points to "zero" on top panel 21; and the last numeral "nine" of the flat tape 42 appears at window 20 when the corresponding pointer 17 position is opposite 9 on the scale of the respective resistance section 26. The numerals between the "zero" and "nine" figures on the tapes 42 are marked in accordance with the intermediate pointer 17 positions on the panel 21 scales, as will now be understood. The paths of the push-pull wires 40 and their associated guide tubes 43 are arranged to extend between the respective wrap-limit plates 53 and the common tape guide 45. Where less than ten digits are indicated, a shorter tape (42) may be utilized.

Unique paths for guide tubes 43 between wrap-limit plates 53 and end plate 65 of tape guide 45 are arranged, including overlapping as shown in FIG. 2. The firm tubes 43 keep the contained wires 40 in operable movable relation. The only caution is not to make any sharp bends. As the practical diameter of the guide tubes 43 is small, this does not interfere with the space afforded between the chassis plate 30 and top panel 21. End plate 65 contains grooves or bores 66 to anchor the corresponding ends of guide tubes 43. End plate 65 is fastened to chassis 30 by screws 67, 67, (see FIG. 2). The wires 40 extend through the anchored guide tubes 43, and motivate the associated numeral tapes 42 in corresponding channels within tape guide 45. Tape guide 45 is made of transparent material, such as Lucite, wherein the tapes 42 are contained in a predetermined linear path adjacent to each other, and their numerals are visible through the opening 20 in panel 21.

FIGS. 6 and 7 are enlarged cross-sectional views through the tape guide 45; FIG. 6 being through an intermediate portion on metallic chassis 30; and FIG. 7 through the free end portion 45' bent over beyond chassis 30. The tape guide 45 is arcuate at its free end 45', and extends downwardly into the interior of the decade box 15 at the location of the binding posts 18, (see FIG. 3). In this manner no additional space is required for the decade box 15, as that space usually taken by the binding posts 18 contains the free end 45' of the tape guide 45, as well as the free ends 42' of tapes 42. The tapes 42 ride in channels grooved in the bottom of tape guide 45 adjacent the surface of chassis 30. Spaces 68 are arranged above the central portions of tapes 42, through which their numerals appear.

In this manner a clear space is provided wherein the numerals printed upon the surface of tapes 42 are not abraided, and appears through the clear Lucite material across the panel 21 opening at window 20. The numerals are thus protected from abrasions, scratches, etc., and are clearly visible when exposed through the window for the readings. The multiple channel tape guide 45 maintains all of the tapes 42 in prearranged alignment, and adjacent to each other to effect numerical totals at window 20.

The flat body portion of the tape guide 45 is secured to chassis 30 by screws 69, 69. The end section 45' of tape guide 45 is arcuate and bends downwardly over the edge of chassis 30, as shown in FIG. 3. A tape guide plate 70 is riveted across the open bottom face of arcuate extension 45' to contain the tapes 42 therein. Rivets 71, 71 secure plate 70 thereto. FIG. 7 is a cross-sectional view therethrough, and FIG. 4 illustrates the arcuate end 45' with plate 70 in position at the bottom of the arc thereof. As shown in FIG. 3, the free ends 42' of numeral tapes 40 are motivated to extend beyond the arcuate tape guide 45'. For decade numerals of lower values, as 0, 1, 2, the tape 42 must be moved a greater linear distance. This requires the free end 42' to extend into the decade box region 72 that is clear of other elements. When a higher numeral e.g. 7, 8, 9 is required at window 20, the tape 42 of course if retracted by clock-wise rotation of the knob 16 to the corresponding numeral on the scale of panel 21, (see FIG. 1).

The invention totalizer system thus provides a direct effective exposition of the totals for the multiple electrical sections of the decade unit, wherein each tape 42 is motivated to a correspondingly synchronized position, with its numeral appearing at window 20 in correspondence with the pointer 17 of the associated knob 16 at the same numeral of its scale on panel 21. The interior surface 52 of the wrap limit plate 53 is case-hardened, as is preferably the peripheral surface and groove 48 of the wrap pulley 41. In this manner negligible wear occurs to effect the phasing or synchronization between the indicated and index numerals for the respective electrical sections.

Should phasing be desired between pointer 17 settings and its tape 42 readings, as for example during initial assembly in production, or in overhauling or service, it is readily performed in the invention totalizer system. One simply removes the knob 16, exposing the stub or collar 61 of wrap pulley 41. The setting of the wrap pulley 41 with respect to the control shaft 27 is then adjusted after loosening the set screw 60 thereof. The wrap pulley is thereupon accurately pre-set to have the numeral tape reading at window 20 correspond to and be with the reading of pointer 17 on its scale on panel 21. The set screw 60 is then set to hold wrap pulley 41 thereat, and knob 16 is secured to shaft 31. It is noted that no major disassembly operation is involved.

FIGS. 8 to 12 illustrate a further application of the decade totalizer system of the present invention. Decade box 100 is a three-unit attenuator, calibrated in decibels, db, in "tens," "units," and "tenths." Attenuator 100, in FIG. 8, is shown set for an attenuation in signal level of 36.9 db, at totalizer indicator 101. The input and output terminal pairs 102, 103 are insulated from each other and from metal top panel 105 by suitable insulating bushings. A metal plate 104, 104' extends between the terminal pairs 102, 103. The terminal pairs 102, 103 have leads 107 extending to the attenuator units 110, 111, 112, in a conventional manner.

The attenuator units 110, 111, 112 are respectively proportioned to attenuate in ten equal db steps for the "tens," "units" and "tenths." Their respective input and output connection sockets 115 are serially connected by coaxial plug-cable assemblies 116 to effectuate the decade attenuation. The attenuator circuits and construction are not detailed, as the invention hereof is applicable generally to decade systems. Each attenuator unit 110, 111, 112 has an individual control shaft 117 protruding above top panel 105 through respective apertures 118. A knob 120 is secured to each control shaft 117 with a set-screw 121, (see FIG. 9). An index 122 is marked on the head of each knob 120 for the associated decade scales on panel 105. Panel 105 is secured to frame 123 with screws 124. A bottom panel 125 sets into slots in frame 123, and rubber feet 126 fasten thereto, (FIGS. 9, 11).

A metallic chassis plate 130 extends below panel 105, parallel thereto. Both are suitably mounted within frame 123 by tubular posts 131, 131. The attenuator units 110, 111, 112 are supported from chassis plate 130, with their shafts 117 extending upwards through panel openings 118. Tape guide 135 extends in a plane perpendicular to the plane through attenuator control knobs 117. Tape guide 135 extends through to open space 106 between input-output terminals 102, 103, (see FIGS. 10 and 11). In this manner, as in the decade resistance box described hereinabove, the invention totalizing system utilizes space normally otherwise present in the decade device. The tape guide 135 is bent at 135a, and then extended downwardly parallel to frame 123 as guide section 135b seen in FIG. 11. An adequate path length is thereby readily provided for the full movements requisite for the numeral tapes 140. The tapes 140 may thus be made sufficiently long and wide to accommodate clear sizable numerals.

There are three "0" to "9" numeral tapes 140 used, individual to each of the attenuator units 110, 111, 112. These tapes 140 are flexible and flat, similar to those used in the decade resistance box described hereinabove. An individual numeral of each tape 140 is visible through window 101, (FIGS. 8 and 10). The illustrated setting reads 36.9 db, corresponding exactly to the setting of knobs 120 of attenuator 100. The numeral tapes 140 are each secured at one end to a push-pull wire 141. Each push-pull wire 141 is sheathed in thin guide tubes 142. Guide tubes 142 extend between each wrap limit plate 145 and the tape guide entry post 146. The tapes 140 move in individual grooves within transparent tape guide 135. The tapes 140 thereupon are held in the full path of tape guide 135. The free end of each tape 140 is moved along tape guide sections 135a, 135b in free space 106 of casing 123. The push-pull action of wires 141 on tapes 140 thereby position the tape numerals in synchronism with the corresponding indexed positions of the attenuator unit knobs 120.

The push-pull wires 141 have a sharply bent end 141a secured in wrap pulleys 150 by set-screws 151, (see FIG. 12). Wrap pulleys 150 are rotatably set in wrap limit plates 145. A collar or stub 150a extends above the body of wrap pulley 150 and is fastened to control shaft 117 through a pin 147 in an aperture thereof. A circumferential groove 152 in each wrap pulley 150 contains a loop of each push-pull wire 141. Wire 141 is thereby set between pulley groove 152 and the case hardened internal surface of plate 145. The wires 141 thereupon extend through the exit grooves 153 in wrap limit plates 145, in the manner hereinabove set forth, and on through the connecting guide tubes 142. The square wrap limit plates 145 are secured to chassis 130 by machine screws 154, 154.

In accordance with my invention, it is noted that the push-pull wires 141 and associated wire guide tubes 142 may readily extend in practically any radial direction from limit plates 145. In this manner the wires 141 are arranged without any sharp bend in their path to tape guide entry post 146. Also, the wires 141 are maintained generally close to the chassis 130, and between the chassis 130 and top panel 105. No additional space is required therefor, as the push-pull wires for the totalizer system hereof is adapted to be set-up and function in a shallow area. The bends required in the wires and guide tubes are of relatively large radius to avoid binding, and may even be made to cross each other, as seen in FIGS. 9, 10. Also some of the wires and guide tubes 141, 142 may extend from below the chassis 130 to the tape guide 135.

Although I have described my invention in connection with two exemplary embodiments, it is to be understood that modifications may be made therein by those skilled in the art, without departing from the broader spirit and scope thereof as defined in the following claims.

I claim:

1. A device of the character described with a plurality of elements individually settable in decade relationship comprising a flexible numeral strip for each of the elements, a push-pull wire mechanically coupled to each of said elements and one end of its associated strip, said numeral strips being adjacently arranged parallel to each other for presenting setting totals of the elements, and means for guiding the other end of each of said strips into a region of the device further including a control shaft extending from each element, a wrap pulley with a collar securable to each shaft by a set-screw, a peripheral groove in each pulley for containing an end loop of its associated push-pull wire, a plate surrounding each wrap pulley about its peripheral groove to contain the member loops therebetween, a control knob panel for the device mounted above said elements, each collar and associated set-screw extending above the knob panel and being accessible from above the panel for ready angular readjustment with respect to its shaft to establish in-phase relationship of each shaft with its associated numeral strip.

2. An electrical decade device with a plurality of electrical elements individually settable in decade relationship, comprising a flat flexible numeral tape for each of the elements, a push-pull wire mechanically coupled to each of said elements and one end of its associated tape, said numeral tapes being adjacently arranged in a plane parallel to each other and in numerical phase with their respective elements for presenting setting totals thereof, and means for guiding the other end of each of said tapes free-ended in individual paths and at an angle away from said plane into an unobstructed region of the device, further including a chassis supporting said elements, a control shaft extending from each element through said chassis, a wrap pulley with a collar extending above the chassis and securable to each shaft, a peripheral groove in each pulley for containing an end loop of its associated wire, a plate surrounding each wrap pulley about its peripheral groove to contain the wire loops therebetween, said plates being mounted to the chassis, a panel arranged parallel to the chassis above said elements, each of said collar containing fastening means extending above said panel and being accessible from above the panel for ready angular readjustment with respect to its shaft to establish in-phase relationship of each shaft with its associated numeral tape.

References Cited in the file of this patent

UNITED STATES PATENTS

| | | |
|---|---|---|
| 2,032,304 | Padgett | Feb. 25, 1936 |
| 2,360,181 | Waltz | Oct. 10, 1944 |
| 2,529,833 | Brietzke | Nov. 14, 1950 |
| 2,597,123 | Naef | May 20, 1952 |
| 2,828,713 | Smith | Apr. 1, 1958 |